United States Patent [19]
Rivoallon

[11] Patent Number: 6,125,205
[45] Date of Patent: Sep. 26, 2000

[54] PROCESS AND DEVICE FOR LABELING A REGION

[75] Inventor: Frédéric Rivoallon, Santec, France

[73] Assignee: Thomas Licensing S.A., Boulogne, Cedex, France

[21] Appl. No.: 08/990,226

[22] Filed: Dec. 15, 1997

[30] Foreign Application Priority Data

Dec. 18, 1996 [FR] France .................................. 96 15548

[51] Int. Cl.$^7$ ....................................................... G06K 9/34
[52] U.S. Cl. .......................................................... 382/180
[58] Field of Search ................................... 382/180, 173, 382/245; 358/261.3

[56] References Cited

U.S. PATENT DOCUMENTS

| | | | |
|---|---|---|---|
| 4,624,013 | 11/1986 | Urushibata | 382/9 |
| 4,887,302 | 12/1989 | Urushibata | 382/180 |
| 5,602,940 | 2/1997 | Inoue et al. | 382/180 |

FOREIGN PATENT DOCUMENTS 0492633 12/1991 European Pat. Off. .
0114189 8/1994 European Pat. Off. ......... H04N 1/41

OTHER PUBLICATIONS

Copy of Search Report.

*Primary Examiner*—Phuoc Tran
*Attorney, Agent, or Firm*—Joseph S. Tripoli; Ronald H. Kurdyla; Alexander J. Burke

[57] ABSTRACT

The present invention relates to a process and device for labeling a region in which the regions are defined by the juxtaposition of segments of a line, which are portions of a line. During a line scan of an image, the invention increments and allocates a label to each segment encountered on the current line when this segment is not connected to any segments of the preceding line. The invention allocates the same label to each segment encountered on the current line as that assigned to the segment of the preceding line when it is connected to the segment. The invention allocates the same label to each segment encountered on the current line as that assigned to the first of the segments of the preceding line. In this last case, the invention stores the relationship between the labels of the successive segments to one and the same segment of the current line.

7 Claims, 1 Drawing Sheet

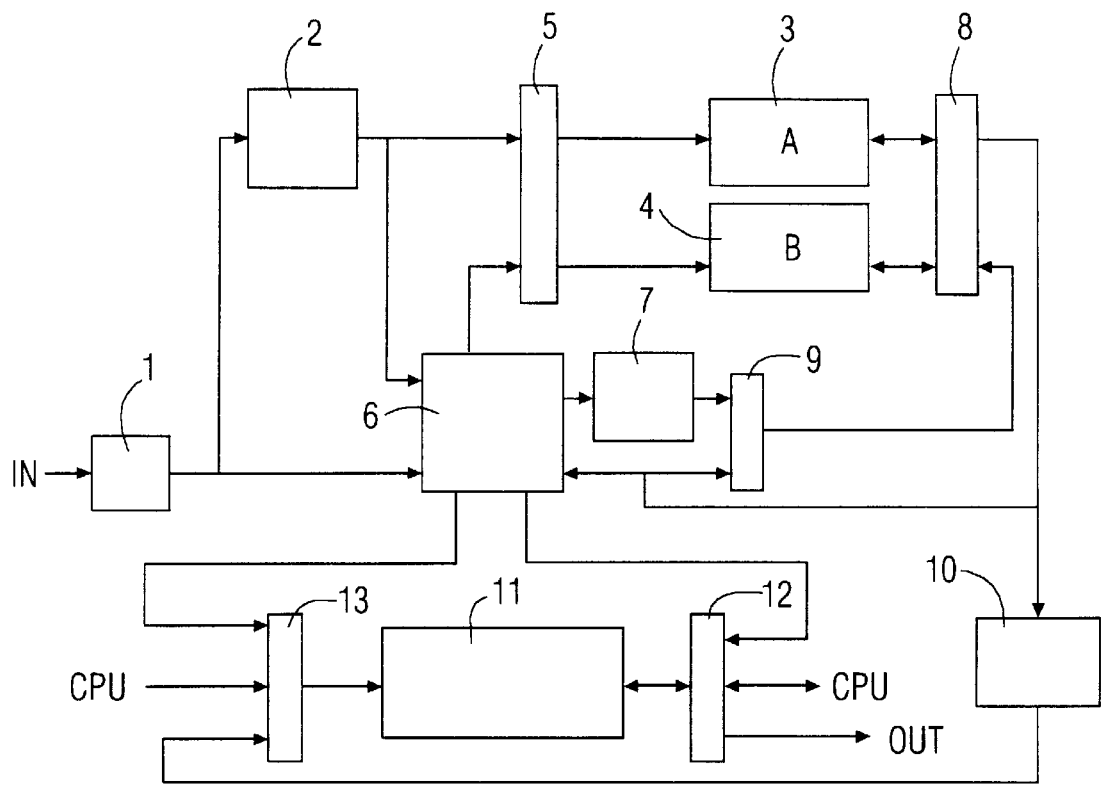
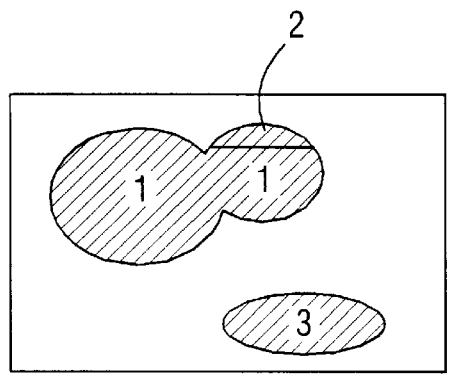
FIG. 2a
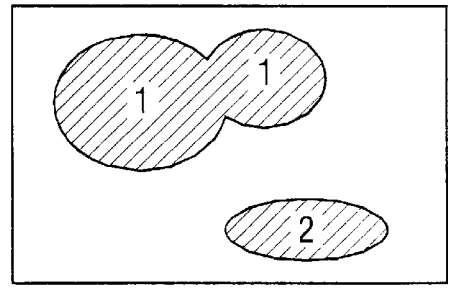
FIG. 2b

PROCESS AND DEVICE FOR LABELING A REGION

The invention relates to image processing and in particular to the labelling of previously determined zones within an image.

This type of operation is for example used for the processing of video data, for the identification of image zones by segmentation or extraction of regions.

The field may be that of industrial inspection for determining for example anomalies in objects from an image of this object originating from a video camera. It can then involve a comparison with a given model or a zone surface evaluation. The anomalies are identified and extracted as specific regions. They are regarded as major or minor depending on the size, and the number of regions. The decision to reject the object or the component inspected is made on the basis of these criteria.

The labelling operation consists in obtaining a grey image, each grey level of which corresponds to a zone number.

For an industrial control type utilization, such processing of the image requires near-real-time or at least very fast operation. It must have high performance in the detection of defects, that is to say in the processing of zones of very small area.

The known processes and devices are generally unsuitable and lengthy to implement owing to the utilization of complex algorithms requiring a considerable number of computations and multiple access to the memories. This is particularly true when the processing is performed at pixel level.

The purpose of the invention is to remedy the aforementioned drawbacks.

To this end, the subject of the invention is a process for labelling regions of a video image which are defined by the juxtaposition of segments which are portions of lines of the image, characterized in that, during the line scan of the image, it increments and then allocates a label to each segment encountered on the current line when this segment is not connected to any segment of the preceding line. It allocates the same label as that assigned to the segment of the preceding line when it is connected to this segment. It allocates the same label as that assigned to the first of the segments of the preceding line to which it is connected when it is connected to more than one segment of the preceding line and in that, in this last case, it stores the relationship between the labels of the successive segments connected to one and the same segment of the current line.

Its subject is also a device implementing the above process.

The process described makes it possible to utilize prewired programmable circuits and thus very considerably to reduce computation time, the algorithms implemented being very fast. The invention allows the processing of images of large area with pixel level definition. The set-up thereof is simplified, low cost and highly flexible.

Other features and advantages of the invention will emerge clearly from the following description given by way of non-limiting example and offered in conjunction with the appended figures which represent:

FIG. 1, a device according to the invention;

FIG. 2a, an example of an image during the first processing phase;

FIG. 2b, an example of an image during the second processing phase.

FIG. 1 represents a device according to the invention.

The input of the device is the input of a segment counter 1. The output of this counter is linked to the input of an FIFO memory 2 and to the input of a comparison, storage and sequencing circuit 3 referred to as CMS. The FIFO output is linked to a first input of a multiplexer 5 and to a second input of the circuit CMS. A first output of the circuit CMS is linked to the second input of the multiplexer 5. A first and a second output of this multiplexer are respectively linked to the address bus of a memory 3 and to the address bus of a memory 4. These two memories, also referred to as A and B, are dubbed connectivity memories. A second output of the circuit CMS is linked to a zone counter 7, the output of this latter being linked, for its part, to a first input of a second multiplexer 9. The data buses of the connectivity memories are linked respectively to two inputs/outputs of a first bidirectional multiplexer 8. An output of this multiplexer is linked to an image storage memory 10, to a second input of the multiplexer 9 as well as to a third input of the circuit CMS. An input of this multiplexer 8 is linked to the output of the multiplexer 9. A third and fourth output of the circuit CMS are respectively linked to a first input of a second multiplexer of bidirectional type 12 and of a third unidirectional multiplexer 13. The output of the multiplexer 13 is linked to an address bus of a synonyms memory 11 and the memory side input/output of the multiplexer 12 is linked to the data bus of this memory. A second input of the multiplexer 13 originates from the output of the image storage memory 10 and a third input of a central processing unit or circuit CPU, not represented in the figure. An input/output of the multiplexer 12 is likewise linked to the circuit CPU and an output of this multiplexer corresponds to the output of the device.

The information items transmitted to the input of the device are binary items, the background of the image corresponding for example to a zero value and the pertinent elements or those to be identified in the image corresponding to a unit value.

These items are obtained from known processing operations such as the "thresholding" of the video image with regard to luminance information, chrominance information, etc.

Hereafter, the succession of pixels having the unit value on a line will be referred to as a segment. A segment is therefore delimited by two pixels with the zero value and the length of a segment can vary from one pixel to one line.

The items are received line by line, one bit per pixel, on the input of the device which is the input of a programmable logic circuit whose various functions are explained below.

These items are transmitted to the input of a counter 1 which will be incremented each time it receives a unit bit which follows a bit at the zero value or which is the first of the line. This is an intra-line numbering counter or segment counter which is initialized with each line start. The clock input of the counter is the clock input of the programmable logic circuit which also feeds the various circuits described hereafter, generally by way of a comparison, storage and sequencing circuit described below.

This clock is for example at the frequency of 40 MHz. The value available at the output of the counter is transmitted at the pixel rate to an FIFO memory 2 which stores the segment numbers for those corresponding to an image line. The purpose of this memory is to delay the items received as input by one line period so as subsequently to transmit them simultaneously over the data bus of a connectivity memory 3 or 4 also termed a table of match-ups, via a multiplexer 5, and to the input of a comparison, storage and sequencing circuit referred to as CMS 6.

The match-up table consists of the two memories 3 and 4.

A comparator of the circuit CMS 6 will compare the items available at the output of the segments counter with the items delivered at the FIFO output, that is to say the number assigned to a pixel of the current line with the number assigned to the corresponding pixel of the line above (also referred to as the preceding line). The circuit CMS, after having entered all the items corresponding to a complete segment of the current line, checks whether this segment matches with at least one segment of the preceding line, that is to say whether there is overlap or inclusion of segments when the two lines are superimposed.

In the negative, that is to say in the case in which, for all the pixels of the segment of the current line, a zero value of the preceding line is matched, an incrementation signal is transmitted as output from the circuit CMS to a zone counter 7.

OPERATION OF THE TABLE OF MATCH-UPS

The memories A and B are mounted as a FLIP-FLOP device. When one of the memories is writing, the other memory is reading and vice versa.

Let us explain the operation of the zone write mode in respect of the segment of the current line which corresponds to phase one of operation of the device. Let us assume the memory A to be in read mode and the memory B to be in write mode.

The segment number of the preceding line exiting the FIFO memory is transmitted over the address bus of memory A and the number of the segment of the current line originating from the circuit CMS is transmitted over the address bus of memory B.

Memory A delivers on its data bus the zone number corresponding to the segment number of the preceding line, the number transmitted to the circuit CMS.

Memory B receives on its data bus the zone number originating from the zone counter or the zone number corresponding to the segment number of the preceding line and originating from the memory A, depending on the command of the multiplexer 9.

The current segment is input into the circuit CMS.

Two cases occur:

First Case

There is a match between the segment of the current line and at least one segment of the preceding line. Hence no incrementation item is transmitted to the zone counter. Memory B records at the address corresponding to the number of the segment of the current line, the zone number originating from memory A for the first matched segment of the preceding line and whose number is presented on the address bus of memory A. If a second segment of the preceding line is matched, a synonyms memory is utilized as explained below.

Second Case

There is no match between the segment of the current line and a segment of the preceding line. Hence an incrementation item is dispatched to the zone counter and this new zone number available at its output is transmitted over the data bus of memory B (the multiplexer 9 is switched accordingly). At the same time a write order is transmitted to this memory whose address bus receives from the circuit CMS and via the multiplexer 5 the number of the segment of the current line.

In other words, if a segment within a line is not "connected" to (that is to say related to) any segment of the preceding line, a new zone label is generated and assigned to the segment by way of the memory of match-ups. If a segment is connected to an already numbered segment of the preceding line, it will be allocated the same zone label as the first segment encountered in the preceding line.

This second case will automatically hold for the first line of the image, the FIFO memory being initialized to zero with each image.

OPERATION OF THE TABLE OF SYNONYMS

An output from the circuit CMS is transmitted to the read/write command input of a synonyms memory 11.

When the circuit CMS processing a segment of the current line detects that this segment links two segments of the preceding line, again when these two lines are superimposed, it transmits a write item to the synonyms memory 11. This memory receives on its data bus and via the circuit CMS and a multiplexer 12, the zone number corresponding to the first segment of the preceding line originating from the connectivity memory and stored in a buffer of the circuit CMS. It receives on its address bus via the multiplexer 13, the zone number corresponding to the second segment originating from the connectivity memory when the address received by this memory corresponds to this second segment.

If, again during the scanning of this same segment of the current line, a new zone number (and hence a new segment of the preceding line) appears at the output of the connectivity memory, the circuit CMS transmits a new write order to the synonyms memory which this time receives on its data bus the zone number corresponding to the second segment of the preceding line, stored in a buffer of the circuit CMS, and over the address bus the zone number originating from the connectivity memory and corresponding to the third segment encountered on this preceding line. And so on for all the segments encountered on the preceding line and matching the current processed segment of the current line.

At the start, the table of synonyms is initialized in a linear manner, that is to say the contents of the memory are initialized to the value y=x, x being the address and y the contents of the memory.

The circuit CMS is made in a manner known per se, which it is not necessary to recall here, from logic circuits of conventional type. The current line and the preceding line are compared pixel by pixel and the information is stored for each segment of the current line. A sequencer then transmits any commands for incrementing the zone counter, the read and write orders for the memories and the commands for the multiplexers making it possible to select the memory in write mode and the memory in read mode as well as the addresses and the data to be taken into account.

During this first phase, the memories A and B alternately store the information items from each image line and these memories alternately transmit these items, line by line, during read mode, to another memory referred to as the image storage memory 10 which will record the zone numbers exiting from A and B at the line frequency, for the entire image.

Phase one is completed when all the lines of the image have been processed and stored in the storage memory 10.

Phase two will then perform an ordering and renumbering of the zones in respect of this image.

Once all the lines of the image have been reviewed, a processing of the contents of the synonyms memory is performed so as to carry out this new numbering on the basis of these snyonyms.

Thus for example, if zone 5 (address) is synonymous with zone 3 (datum) and if zone 8 (address) is synonymous with zone 5 (datum), a reordering stores at the addresses 3, 5 and 8 of the memory, the single datum 3. The values of zone 5 and 8 which are left free are used for the renumbering of the higher zones, the decrementation of the higher zones thus being rendered possible. This reordering is for example performed by a central processing unit or CPU (for "Control Processing Unit"). During this phase, the multiplexers 12 and 13 link the address and data buses of the synonyms memory to the bus of the central processing unit which will undertake the reordering, transferring the new data to the synonyms memory once this processing has been performed.

Once reordering is complete, the CPU transmits an order to read the image storage memory. The data bus of this memory is then linked to the address bus of the synonyms memory by way of the multiplexer 13 and the data bus of this memory is linked to the output of the device by way of the multiplexer 12. These multiplexers, like the storage memory and the synonyms memory, therefore receive signals for commanding the circuit CPU, which are not represented in the figure.

An example of the operation is explained below with the aids of FIGS. 2*a* and 2*b*.

During the scanning of the first lines of the current image, these lines consisting of pixels at the zero value, no storage or counter incrementation is performed by the device.

When the first line possessing at least one pixel at the unit value is transmitted, which line will be referred to as n, and is received at the input of the device, the corresponding segment increments the segment counter to the value one. A succession of zeros is then received at the input of the device still on this same line before a second succession of bits at the one level appears, incrementing the segment counter to the value two corresponding to the number of the second segment on this line. The preceding line having all its pixels at the zero value, the comparison between the numbers allocated to the pixels of the current line (values exiting the segment counter) and those allocated to the pixels of the preceding line (values exiting the FIFO memory) entails an incrementation of the zone counter to the value one for the first segment received at the input and then to the value two for the second segment received of the current line. The incremented zone counter output is stored after each incrementation in the connectivities memory, for example B, at the address received from the circuit CMS and corresponding to the segment number of the current line, the zone number one is stored at the segment address one and the zone number two at the segment address two.

Thus a zone number is associated with each segment number.

When the first segment of the new current line n+l is received, matching the segment of the preceding line n, no zone incrementation signal is transmitted to the zone counter. The circuit CMS transmits a write order to the connectivity memory which is now A and which receives on its address bus the number of the segment of the current line. The item recorded at this address is the output of memory B whose address is the FIFO output, that is to say the segment number of the preceding line n. The zone number of the matched segment of the preceding line is therefore transmitted over this data bus. This value is retransmitted via the multiplexer 9 over the data bus of memory A to the address previously indicated. In this way, the zone number of the matched segment of the preceding line is associated with the segment number of the current line. This value is simultaneously recorded in the storage memory 10.

The same operation is then performed for the segment numbered two with which the zone number two is associated.

At the new current line n+p, the two segments merge into a single one. A write item is transmitted to the synonyms memory when a second segment of the preceding line is matched with the same segment again of the current line. This memory receives on its data bus the zone number originating from the connectivities memory and placed in a buffer memory of the circuit CMS when the first segment of the preceding line is matched. The zone number originating from the connectivities memory and corresponding to the number of the second matched segment of the preceding line is received on the address bus.

Thus, during the processing of this line n+p, the value one is stored at the address two of the synonyms memory.

A segment corresponding to a new zone is encountered at line n+p+q. No match existing with a segment of the preceding line, the zone counter is incremented to the value three. The synonyms memory is not affected by this zone.

The second phase of the labelling process is represented by FIG. 2*b*. A renumbering of the zones is performed. The value one corresponds to the address one and two of the synonyms memory. Thus, the zone number two becomes available and is utilized to renumber the zone initially numbered three. To do this, the value two is recorded at the address three, which initially contained the value three.

The storage memory is then read, its output being connected to the address input of the synonyms memory. The values one are transmitted as output from the synonyms memory to the value of zone one and two. The number two is transmitted to the value of zone three following renumbering of the zones.

This is an example embodiment of a device implementing the labelling process and this example is not limiting.

Except for the memory and CPU circuits, all the circuits described may be embodied from a programmable logic circuit more commonly known as a "Programmable Logic Device" (PLD).

I claim:

1. Device for labeling regions of a video image which are defined by portions of line of the image, this device comprising:

a segment counter receiving the data relating to the video image according to a line scan and whose output delivers a segment number;

a FIFO line memory memorizing said segment number;

a comparison, storage and sequencing circuit to determine the connection of a segment with a segment of the preceding line, and to provide a triggering signal when the segment encountered on the current line is not connected to any segment of the preceding line;

a zone counter triggered by said triggering signal and delivering a label;

a connectivity memory receiving said label to store it, when this label is modified by a segment, at the address corresponding to the number of said modified segment.

2. Device according to claim 1, characterized in that the connectivity memory (3, 4) consists of a first memory A (3) and a second memory B (4) operating in flip-flop mode and in that, when the segment encountered on the current line is connected to at least one segment of the preceding line, the first memory (3) receives on its address bus the number of the first connected segment of the preceding line originating from the FIFO memory so as to deliver as output the corresponding zone number, and the second memory (4) stores this zone number transmitted over the data bus of the second memory to the address corresponding to the number of the segment encountered delivered by the segment counter (1), the role of the memories being reversed at the succeeding line.

3. Device according to claim 1, characterized in that it includes a synonyms memory (11) which receives, when the segment encountered on the current line is connected to more than one segment of the preceding line, on the data bus, the item from the connectivity memory (3, 4) contained at the first corresponding to the number of the first matched segment of the preceding line and, on the address bus, the item from the connectivity memory (3, 4) contained at the address corresponding to the number of the succeeding matched segment of the preceding line, so as to store the datum at the address received, and so on for all the segments matched the segment encountered, the first segment becoming the succeeding segment.

4. Device according to claim 3, characterized in that a renumbering of zones is performed as a function of the identical contents at different addresses of the synonyms memory.

5. Device according to claim 1 characterized in that the data relating to the video image correspond to at least one bit allocated to each of the pixels of the image, a segment being defined by one or a succession of pixels in the 1 state flanked by pixels in the zero state except at the beginning and end of a line.

6. A process for labeling regions of a video image which are defined by a juxtaposition of segments which are portions of line, the steps comprising of an image during a line scan of an image incrementing and allocating a label to each segment of a line of a video image encountered on a current line of said video image when this segment is not connected to any segment of a preceding line of said video image, allocating a same label to this segment as that label assigned to a segment of a preceding line when it is connected to this segment, and allocating a same label to this segment as that label assigned to a first of the segments of the preceding line to which it is connected when it is connected more than one segment of the preceding line and in this case storing a relationship between labels of successive segments of the current line, and each said label being allocated segment by segment.

7. The process according to claim 6 further comprising the step of relabeling the segments according to the relationship between the labels in the case of allocating a same label to this segment as that label assigned to the segment of a preceding line.

* * * * *